United States Patent [19]

Craun et al.

[11] Patent Number: 5,093,425

[45] Date of Patent: Mar. 3, 1992

[54] SULFONIC FUNCTIONAL POLYMERIC COATINGS

[75] Inventors: Gary P. Craun, Berea; Barbara L. Kunz, Strongsville, both of Ohio

[73] Assignee: The Glidden Company, Cleveland, Ohio

[21] Appl. No.: 437,181

[22] Filed: Nov. 16, 1989

[51] Int. Cl.$^5$ .................. C08L 33/14; C08L 41/00; C08L 35/00; C08L 39/00
[52] U.S. Cl. .................................. 525/212; 525/217
[58] Field of Search ............... 525/212, 535, 217

[56] References Cited

U.S. PATENT DOCUMENTS

| | | | |
|---|---|---|---|
| 3,992,333 | 11/1976 | Emmons et al. | 521/149 |
| 4,192,826 | 3/1980 | Beresniewicz et al. | 525/425 |
| 4,724,244 | 2/1988 | Kempter et al. | 525/535 |

FOREIGN PATENT DOCUMENTS

| | | | |
|---|---|---|---|
| 3820972 | 10/1963 | Japan | 525/212 |
| 54-52153 | 4/1979 | Japan | 525/212 |
| 1187123 | 4/1970 | United Kingdom | 525/212 |

OTHER PUBLICATIONS

Powder Coating: Why—How—When, Detroit Soc. for Paint Tech., Joseph Smarsh, 10-27-71.

*Primary Examiner*—John C. Bleutge
*Assistant Examiner*—W. R. H. Clark
*Attorney, Agent, or Firm*—Thomas M. Schmitz

[57] ABSTRACT

Thermosetting coating compositions are based on thermosetting polymeric binder comprising a blocked sulfonic acid functional addition polymer of copolymerized monomers, including sulfonic acid monomer, adapted to coreact upon heating with amine crosslinker.

10 Claims, No Drawings

SULFONIC FUNCTIONAL POLYMERIC COATINGS

BACKGROUND OF THE INVENTION

This invention is directed to heat curable protective coatings and more particularly to a sulfonic acid functional polymer adapted to be crosslinked with an amine polymer.

This invention pertains to protective surface coatings commonly known as paint coatings. Protective or surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives. The polymeric binder functions as a dispersant for the pigments, inerts, and other additives in wet coating compositions and further functions as a binder for the pigments and inert fillers in the cured or hardened paint film. Polymeric binders can be thermoplastic or thermosetting binders based on coreactive components such as a reactive functional polymer adapted to crosslink or coreact with a crosslinking component such as melamine or isocyanate.

Conventional thermosetting polymers often require high temperatures as well as external crosslinkers. Some crosslinkers, such as melamines in conventional industrial coatings or triglycidyl isocyanurate for powder coatings, can cause toxicity problems. Also, the release of volatile by-products, such as caprolactam, from some of these materials can cause film defects, such as cratering and bubbling.

It now has been found that excellent non-aqueous and aqueous paint coatings can be produced based on an polymeric binder comprising a sulfonic acid functional polymer coreacted or neutralized with an amine functional polymer. Blocking of the sulfonic acid group on the polymer with a volatile amine prevents intermolecular association until heat curing (baking). Thus, sulfonic acid functional ionic polymers can be crosslinked with amine functional crosslinkers such as diamines or oligomeric amines. The ionic polymers or "polysalts" were found to provide interreacting polymer chains which exhibit thermosetting properties. A polysalt can be defined as a polymer composed of a polymeric backbone containing a small amount of pendant acid groups, and in this invention usually less than 30 mole percent sulfonic acid groups, which are neutralized partially or completely with an amine functional oligomer or polymer. These ionic moieties and their interactions dominate the behavior of the polymer itself where the amine functional polymers underdo an acid-base reaction with the sulfonic acid functional polymer. The sulfonic acid group loses its proton to the amine group and hence, an ion pair is formed. A highly desirable polymer can contain both sulfonic acid and amine functionality whereby the polymer becomes self crosslinking upon heat curing.

Ionic hydrocarbon polymers for elastomers or plastics based on carboxyl functional polymers are disclosed in U.S. Pat. No. 3,264,272. Related copending and commonly assigned applications for patent are Ser. No. 423,050 filed Oct. 18, 1989 pertaining to carboxyl functional latex binders neutralized with a zinc salt; Ser. No. 397,280 filed Aug. 23, 1989, pertaining to certain carboxyl functional polymers for paint coating neutralized with an organic zinc compound; Ser. No. 397,279 filed Aug. 23, 1989 pertaining to certain carboxyl functional polymers for paint coatings neutralized with zinc carbonate; and Ser. No. 424,981 filed Oct. 23, 1989 pertaining to carboxyl functional latex binders neutralized with a zinc salt.

In accordance with this invention, it has been found that changes in the properties of polymeric binders for paint coatings can be achieved through the introduction of amine functional crosslinkers where modification of polymer properties is believed partially due to ion pairs formed from adjacent polymer chains which behaves essentially like a crosslink. Among the dramatic effects that have been observed with paint compositions are increases in the moduli, increases in glass transition temperatures, and increases in viscosities. The formation of ionomeric clusters in protective surface coatings causes the sulfonic acid functional polymers to behave like a phase-separated block copolymer. Being that a sulfonic acid group is a stronger acid than a carboxyl acid group, the driving force to form the ionic spcies in the presence of amine functionality is greater. Coatings based on the resulting sulfonic acid polysalts exhibit excellent film properties. The use of polysalts in powder coatings specifically is particularly advantageous since control of the process is such that the temperature during extrusion is lower than that of the volatilization temperature of the blocked sulfonic acid group. Thus, the "crosslinks" are not formed until after processing of the powder coating, application to a substrate, melting of the powder, flow out and leveling to form a smooth continuous film. In this invention, the actual crosslinking takes place during the bake cycle which comprises cure temperatures higher than the temperature where the sulfonic acid group becomes unblocked. It has been found that sulfonic acid acrylic polymeric binders are more reactive than similar carboxylic acid functional polymer, and consequently, the cures are faster and at lower temperatures to provide improved cured films exhibiting improved properties such as solvent resistance and hardness.

In essence, the sulfonic acid polymers can be blended with amine, pyridine, amidine, and similar nitrogen containing functional compounds or polymers to give a system containing mixed ionizable functionalities. The sulfonic acid group, in this case, could be blocked using a suitable blocking group, such as an amine. The blocking group volatilizes during the cure cycle, and the two polymers coreact by an acid-base reaction to form an ionic crosslinked matrix. The polymer network formed exhibits solvent resistance, high gloss, and hardness.

These and other advantages of this invention will become more apparent by referring to the detailed description and illustrative examples.

SUMMARY OF THE INVENTION

Briefly, the coating composition of this invention is based on a polymeric binder comprising a sulfonic acid functional polymer blocked by a volatile blocking agent adapted to unblock upon heating. The polymer is mixed with a coreactive nitrogen containing functional group either on the sulfonic acid functional polymer or on an external crosslinking compound. Sulfonic acid functional polymers contain at least 2% by weight ionizable sulfonic acid groups and preferred ionizable sulfonic acid functional copolymers are acrylic copolymers. On a weight basis, a thermosetting mixture comprises between 30% and 99% of sulfonic acid functional polymer and between 1% and 70% coreactive amine crosslinker, while a self-crosslinking sulfonic acid functional polymer contains both sulfonic acid and amine functionality and need not contain an amine crosslinker.

DETAILED DESCRIPTION OF THE INVENTION

The coating compositions of this invention are coatings based on a polysalt polymeric binder comprising a blocked sulfonic acid functional polymer adapted to be crosslinked by nitrogen containing functional groups either on the polymer or on an external crosslinker.

Referring first to the sulfonic acid functional polymer, useful polymers comprise acrylic copolymers comprising copolymerized ethylenically unsaturated monomers including a sulfonic acid monomer. It is believed that polarity and/or the hydrogen bonding capacity of the preferred useful polymers explains their ability to form good ionomers. Polymers with low polarity and lower hydrogen bonding tendencies are generally hydrophobic. Ionic groups generally present in a hydrophobic environment have a greater tendency to associate, thus avoiding the unfavorable hydrophobic environment. It is expected that more hydrophobic polymers will form considerably improved networks.

Copolymerizable ethylenically unsaturated monomers useful in producing the sulfonic acid functional acrylic copolymer are monomers containing carbon-to-carbon, ethylenic unsaturation and include vinyl monomers, acrylic monomers, allylic monomers, acrylamide monomers, and specifically mono- and disulfonic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3-butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

The sulfonic acid functional acrylic copolymer of this invention comprises copolymerized ethylenically unsaturated monomers including at least 2%, broadly between 2% and 50%, but preferably between 10% and 20% by weight of sulfonic acid monomer. Useful sulfonic acid monomers contain an —SO₃H group and comprise the generalized structure:

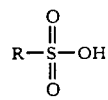

where R contains vinyl, acrylic, methacrylic or allylic ethylenic unsaturation. Suitable and useful sulfonic acid monomers include, for instance, vinyl sulfonic acid, acrylamidopropane sulfonc acid, acrylamido methyl propane sulfonic acid, and particularly 2-acrylamido-2-methyl-1-propane, and similar sulfonic acid monomer.

In accordance with this invention, the sulfonic acid polymers can be blocked with an appropriate blocking group and blended with amino-functional or polyamine crosslinking compounds having two or more basic groups to provide a binder containing mixed ionizable functionalities. The acid group of the sulfonic acid functional polymer can be blocked with a suitable amine such as diisopropanol amine, triethylamine, butylamine, as well as ammonia, pyridine and other basic organic compounds having boiling points below about 250° C. On an equivalent basis, excess equivalents of blocking are coreacted with available sulfonic acid groups where at least about 1% excess equivalents of blocking agent are preferred. The sulfonic acid functional monomer can be blocked before copolymerization with the other monomers, or alternatively, the resulting sulfonic acid functional copolymer can be reacted with blocking agent to block the sulfonic acid group. The blocking group provides storage stability, but then volatilizes during the cure cycle whereupon the sulfonic acid polymer coreacts with polyamine to form a crosslinked matrix to form a cured film exhibiting good solvent resistance, high gloss, and hardness.

Useful acrylic copolymers of sulfonic acid functional acrylic copolymers can be produced by polymerizing monomers in bulk or in an organic solvent, but solvent-water solution polymerization or suspension or latex polymerization are preferred to produce the sulfonic functional polymer. Organic solvent-water polymerization mediums can be polar mixtures such as butanol/ethanol/water. Other suitable organic solvents such as acetone, methylethylketone, and certain higher ketones can be mixed with water or with alcohols such as methanol, propanol, and isopropanol, or lower esters such as methylacetate, butyl cellosolve, cellosolve acetate, and similar organic solvents. Solution polymerization in water or water-solvent mixtures are particularly suitable at higher, sulfonic acid levels, where the resulting polymers do not have good solubility in hydrophobic solvents such as xylene or mineral spirits. The sulfonic acid functional acrylic copolymer comprises copolymerized ethylenically unsaturated monomers, including ionizable sulfonic acid monomers, to produce a copolymer containing reactive primary sulfonic acid groups where the copolymer has a number average molecular weight between 500 and 100,000 and preferably between 1,000 and 10,000. Number average molecular weights are typically measured by GPC according to ASTM methods such as D3016-72; D3536-76; D3593-80; or D3016-78. Aqueous emulsion polymerization produces latexes having a substantially higher molecular weight comparable to conventional latexes. The acrylic copolymers can be liquid at room temperature for solution coatings or high solids but are solid for powder paints. Polymers for powder coatings generally have a Tg between 20° C. and 100° C. as calculated by the Fox equation based on the weight ratio of specific monomers. The Acid No. of the sulfonic acid functional polymer is between 10 and 100 and preferably is between 25 and 75. Polymerization of ethylenically unsaturated monomers including sulfonic acid monomers can be activated by peroxide or azo or other free radical initiator at polymerization temperatures typically between 40° C. to 170° and preferably between 70° C. to 150°. Typically 0.2% to 5% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred. Other initiators include azo initiators such as azobisisobutyronitrile and persulfate or ammonium persulfates. Molecular weight control can be achieved by adjusting temperature, initiator level, or by the addition of chain transfer agents, such as the common mercaptans.

Amine functional polymers suitable for reacting with the sulfonic acid functional polymers are typically copolymers containing between 2% and 50%, preferably 10% to 20% by weight of a basic or amine functional ethylenically unsaturated monomer containing amine groups with the balance being acrylic and/or other ethylenic monomers. Suitable basic monomers include dimethylaminoethyl acrylate and methacrylate, 4-vinyl pyridine, and N,N-dimethyl amino styrene, and the like. These monomers can be copolymerized with the common ethylenically unsaturated monomers such as the previously described acrylate, methacrylate, styrenic, vinyl and vinyl halide monomers. Bulk, emulsion and organic solution polymerization are useful although organic solution polymerization is preferred. Other polyamine and amine functional oligomers are also suitable such as triethylene diamine, piperazine, diamino decane, amine functional oligomers such as amine functional compounds such as trifunctional amine obtained by reaction of dimethyl maleate with 1,6-hexane diamine or dimethylamino propylamine.

On a weight basis, the thermosetting polymeric composition of this invention comprises between about 30% and 99% sulfonic acid functional polymer and between about 1% and 70% amine functional crosslinker. The polymers can be blended together in ordinary mixing equipment.

Coatings based on the foregoing polysalts as binders can be applied to various substrates, and baked under normal conditions. Cured paint films produced in accordance with this invention provide interactions between polymer chains in a crosslink type fashion to produce cured paint films exhibiting considerable MEK resistance, water resistance, improved hardness, and other film integrity properties.

The merits of this invention are further illustrated in the following examples.

EXAMPLE 1

1. Prepare a sulfonic acid functional acrylic polysalt as follows:

a)
   207 g: 2-acrylamido-2-methylpropane sulfonic acid
   200 g: methanol
   200 g: deionized water
b)
   100 g: styrene
   495 g: methylmethacrylate
   234 g: butyl acrylate
   600 g: n-butanol
   9.0 g: mercaptoethanol
   10 g: azobis 2-methyl propanenitrile initiator Vazo 64

Prepare solution (a), and add it to solution (b). Bring to reflux under nitrogen (~85° C.), and hold 1.5 hours. Add 10 g additional Vazo 64, hold 1 hour, add 5 g more, hold 0.5 hours, and cool. Product is a low to medium viscosity, slightly hazy solution.

The sulfonic acid acrylic polysalt described above was blocked with an appropriate blocking group, such as diisopropanol amine. This blocked polysalt was blended in stoichiometric quantities with amino-functional polymers. An amino functional polymer was produced as follows:

2. Amine functional polymer a)
   500 gms.: methyl ethyl ketone
b)
   20 gms.: t-butylperbenzoate
   157 gms.: dimethylaminoethyl methacrylate
   100 gms.: styrene
   623 gms.: methyl methacrylate
   120 gms.: butyl acrylate Bring (a) to reflux about 140° C.; then add (b) over about 3 hours; hold for about ½ hour and cool to room temperature.

A stoichiometric blend of the sulfonic acid polymer with the amine polymer was made by mixing 100 wt. parts sulfonic acid polymer with 33 wt. parts. amine polymer. Upon curing a 1.5 mil film at 400° C. for 20 minutes and driving off the amine blocking group the two polymers coreacted to give a crosslinked film. Properties of the coating are shown in Table 1.

TABLE 1

| Properties of Mixed Acid: Amine Monomer | | | |
| --- | --- | --- | --- |
| Film Build (mils) | MEK Resistance* | 60 Gloss (%) | Knoop Hardness (KHN) |
| 2.2 | 163 | 82.3 | 24.8 |

(*# double rubs to substrate*)

EXAMPLE 2

Triethylene diamine having an equivalent weight of 51 and triamine containing three primary amines and being a reaction product of 1,6-hexane diamine and maleic anhydride were each combined with a sulfonic acid functional acrylic polymer on a stoichiometric basis. The acrylic polymer comprised copolymerized monomers as shown in Example 1. About 10% by weight butyl cellosolve was added to each composition to assist in film formation. Drawdown films were prepared over Leneta form 7 B using a 0.003 inch Bird blade and the films were baked for 5 minutes at 250° F. Smooth, glossy cured films resulted exhibiting the following properties:

| | Diamine | Triamine |
| --- | --- | --- |
| MEK Resistance* | 23, 25 | 53, 58 |
| DI Water Resistance* | 20, 24 | 18, 22 |

*Number of double rubs until breakthrough to substrate.

We claim:

1. A thermosetting protective paint coating containing pigment and a polymeric binder, where the improvement comprises:

a sulfonic acid functional polymeric binder containing sulfonic acid functional copolymer chains and amine functional polymer chains, where said polymeric binder is self-crosslinking upon curing and comprises on a weight basis:

(a) between 30% and 99% of sulfonic acid functional copolymer consisting of copolymerized ethylenically unsaturated monomers of 10% to 50% sulfonic acid monomer with the balance being other ethylenically unsaturated monomer, where the sulfonic acid groups on said copolymer are blocked with a volatile amine blocking agent having a boiling point below about 250° C.; and (b) between 1% and 30% amine functional polymer chains of copolymerized ethylenically unsaturated monomers comprising 2% to 50% amine functional monomer with the balance being other ethylenically unsaturated monomer;

where said paint coating is adapted to self-crosslink upon heating by said sulfonic acid groups becoming unblocked and coreactive with said amine groups in an acid-base reaction to form an ionic crosslink between said sulfonic acid and said amine groups.

2. The coating composition of claim 1 where the sulfonic acid groups on the sulfonic acid monomer are blocked with the amine blocking agent.

3. The coating composition of claim 1 where the sulfonic acid groups on the sulfonic acid monomer are unblocked to produce said sulfonic acid functional copolymer, and said unblocked sulfonic acid groups on the polymer are subsequently blocked with the amine blocking agent.

4. The coating composition of claim 1 where the sulfonic acid functional copolymer contains 10% to 20% copolymerized sulfonic acid monomer.

5. The coating composition of claim 1 where the coating is a powder coating and the polymeric binder has a Tg between about 20° C.–100° C.

6. The coating composition of claim 1 where the sulfonic acid functional copolymer has an Acid No. between 10 and 100.

7. The coating composition of claim 1 applied to a substrate and heat cured to form a crosslinked thermoset coating.

8. The coating composition of claim 1 where the coating composition is an aqueous coating.

9. The coating composition of claim 8 where the sulfonic acid functional copolymer was produced by copolymerizing said ethylenically unsaturated monomers in water.

10. The coating composition of claim 8 where the sulfonic acid functional copolymer was produced by copolymerizing said ethylenically unsaturated monomers in a mixture of water and organic solvent.

* * * * *